(12) United States Patent
Reid et al.

(10) Patent No.: US 7,631,290 B1
(45) Date of Patent: Dec. 8, 2009

(54) ENHANCED NAVIGATION FOR VISUAL DESIGN EDITING

(75) Inventors: Dexter Reid, San Francisco, CA (US); Tatyana Dimalsky, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 806 days.

(21) Appl. No.: 10/974,556

(22) Filed: Oct. 27, 2004

(51) Int. Cl.
G06F 9/44 (2006.01)
(52) U.S. Cl. .................... 717/105; 717/100; 715/764
(58) Field of Classification Search .................. None
See application file for complete search history.

(56) References Cited

U.S. PATENT DOCUMENTS

| 5,845,299 | A | * | 12/1998 | Arora et al. | 715/209 |
| 6,792,595 | B1 | * | 9/2004 | Storistenau et al. | 717/110 |
| 2004/0205594 | A1 | * | 10/2004 | Arora et al. | 715/513 |

OTHER PUBLICATIONS

Goldman,N.M., Balzer, R.M. The ISI Visual Design Editor Generator, Visual Languages, 1999 Proceedings. IEEE Symposium, Sep. 13-16, 1999, pp. 20-27. [retrieved on Jul. 28, 2009] Retrieved from the Internet: URL<http://ieeexplore.ieee.org/stamp/stamp.jsp?arnumber=00795871.*
Fekete et al. Using the Multi-Layer Model for Building Interactive Graphical Aplications, 1996, pp. 109-118. Retrieved from Internet:URL<http://delivery.acm.org/10.1145/240000/237108/p109-fekete.pdf?key1=237108&key2=0184788421&coll=GUIDE&dl=GUIDE&CFID=45697125&CFTOKEN=37291121.*

* cited by examiner

*Primary Examiner*—Tuan Q Dam
*Assistant Examiner*—Cheneca P Smith

(57) ABSTRACT

A system and method is described for visually editing a stacked object in a design view canvas of an application development environment. Within the design view canvas, a badge control is rendered that is associated with the stacked object. A set of one or more navigation tools is contained within the badge control along with a set of one or more editing tools. When the user interacts with the navigation tools, presentation of the information contained by the stacked object is controlled. When the user interacts with the editing tools, the content and composition of the stacked object can be manipulated.

36 Claims, 7 Drawing Sheets

ENHANCED NAVIGATION FOR VISUAL DESIGN EDITING

TECHNICAL FIELD

The present invention relates, in general, to application development environments and, more specifically, to an enhanced navigation for visual design editing.

BACKGROUND OF THE INVENTION

In the early stages of the computer industry, computer application development generally comprised developers coding the applications in text editors. These applications would, thereafter, be compiled or run in a separate, language-specific compiler or translator to produce the computer-executable code. As the computer industry has advanced, application development environments have been integrated into the language platforms along with other features and functions that make the application development process much easier. Modern application development environments include features that assist the developer in coding applications, such as a visual differentiation between standard code terms, built-in debuggers or syntax checkers, compilers, code hinting, and the like. Thus, software developers may completely develop and debug applications using these application development environments.

One of the reasons that the computer industry has grown as quickly and extensively as it has is the increase in the graphical interface with the public. Computer applications have become increasingly more visually and graphically oriented. Commensurate with this graphical increase, application development environments have also advanced to include visual or graphical editing. Application development environments with design view editing generally present the graphical results of an application to a developer and allows the developer to edit and create the application by graphically manipulating the visual objects displayed in the design view interface. Application development environments, such as MACROMEDIA INC.'s DREAMWEAVER™, FLEX BUILDER™, BORLAND SOFTWARE CORPORATION's DELPHI™, JBUILDER™, and the like, offer developers a visual editing mode as well as a code editing mode. These application development environments offer fully-operable visual representations of the various components, objects, and parts that make up a software application that the developer may set and manipulate in creating the application.

The graphical editing modes of the application development environments implement a complex relationship between graphical rendering and logic execution. For example, a scrollbar component on a design view stage is graphically rendered within the application development environment, but also uses logic to control the display screen of the application and includes properties that are editable by the developer which affects the appearance of the scrollbar in the application. This interrelationship has typically been implemented using a layered approach.

Several layers operate in the running application development environment. In existing application development environments, such as DELPHI™, when a component is placed onto the graphical development interface, the component itself is actually the underlying code for the component being run and displayed on a first layer. A separate mask layer is placed on top of the component. The user or developer interactions with the component are actually interactions captured by this mask layer. The mask layer includes the edit interface items, such as the sizing handles, selection indicators, and the like. As the user interacts with the components, the interactions are captured by the mask layer and logic within the application development environment is operated to determine whether those actions are directed to the component, in which case the actions are passed to the component for operation, or whether those actions are directed to editing the component, in which case the actions are passed to the application development environment for changing the display or operation of the component in the underlying layer.

This layered approach is useful because it allows for a more accurate representation of the actual component as it will be rendered and operated by the finished software application. If the edit interface objects were rendered directly onto the components in the graphical editing stage, the shape and possibly even the function of the component would be different than in the final application, and the developer may not get an accurate view of how the final application will both look and operate.

Modern software applications routinely use presentation objects to provide information and functionality to the application user. Presentation objects may be items, such as windows, boxes, and the like. More complex presentation objects, such as accordion interfaces, tabbed navigators, and the like, provide the ability to present a large amount of data or functionality in a well-organized fashion. These stacked presentation object, therefore, create a z-axis space in modern applications. However, in many applications, the information or logic that is present or available in the z-space of these stacked containers, is only calculated at runtime. In creating such stacked navigators, a developer will typically execute a number of steps to add a new page, associate the page with the navigator, and then develop the content of that new page. Thus, building such stacked objects typically costs considerable development time.

BRIEF SUMMARY OF THE INVENTION

The present invention is directed to a system and method for visually editing a stacked object in a design view canvas of an application development environment. Within the design view canvas, a badge control is rendered that is associated with the stacked object. A set of one or more navigation tools is contained within the badge control along with a set of one or more editing tools. When the user interacts with the navigation tools, presentation of the information contained by the stacked object is controlled. When the user interacts with the editing tools, the content and composition of the stacked object can be manipulated.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1A:
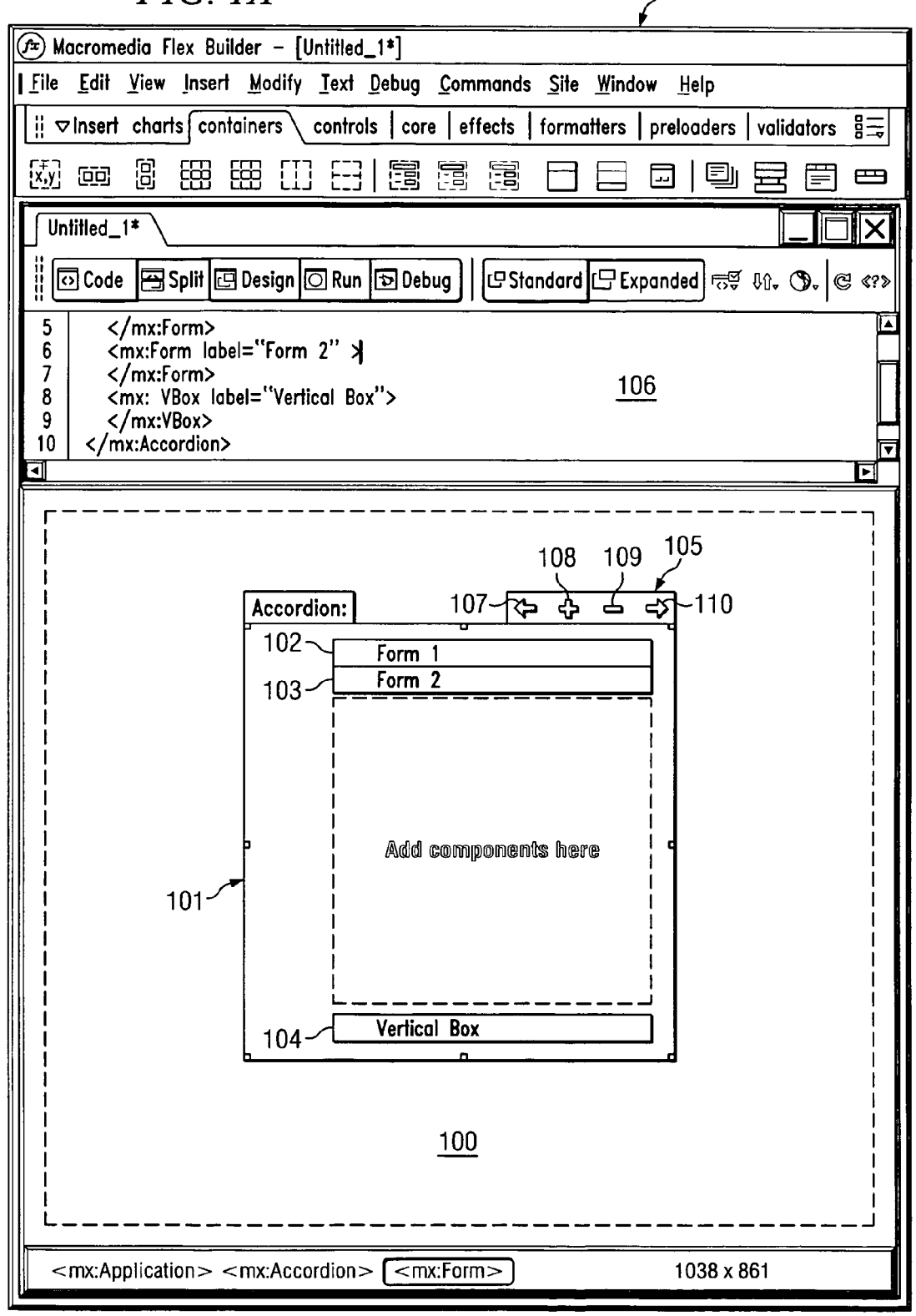
FIG. 1A is a screenshot illustrating an application development environment configured according to one embodiment of the present invention.

FIG. 1A is a screenshot illustrating application development environment 10 configured according to one embodiment of the present invention. Application development environment 10 includes design view stage 100 and code view 106 that offers a developer a choice to edit the application graphically, in design view stage 100, or textually, in code view 106. Design view stage 100 reflects accordion navigator 101 positioned within the application. Accordion navigator 101 includes accordion dividers 102-104 which separate the content of the various accordion views. As a user would select one of accordion dividers 102-104, the information presented in accordion navigator 101 is changed.

Badge control 105 is also displayed on design view stage 100 associated with accordion navigator 101. Badge control 105 is an editing interface that allows a developer to control the operation of accordion navigator 101. Badge control 105 includes navigation buttons 107 and 110 as well as editing buttons 108 and 109 that interact with the code underlying accordion navigator 101. If the developer desires to progress through the content of accordion navigator 101, he or she may actuate forward arrow 110 or backward arrow 107 on badge control 105. As shown in FIG. 1A, the content associated with accordion divider 103 is displayed in the main part of accordion navigator 101. If the developer actuates forward arrow 110, the content of accordion navigator 101 would change to that corresponding to accordion divider 104. Thus, the developer's interaction with badge control 105 is carried out through operation of the component code underlying accordion navigator 101.

Figure 1B:
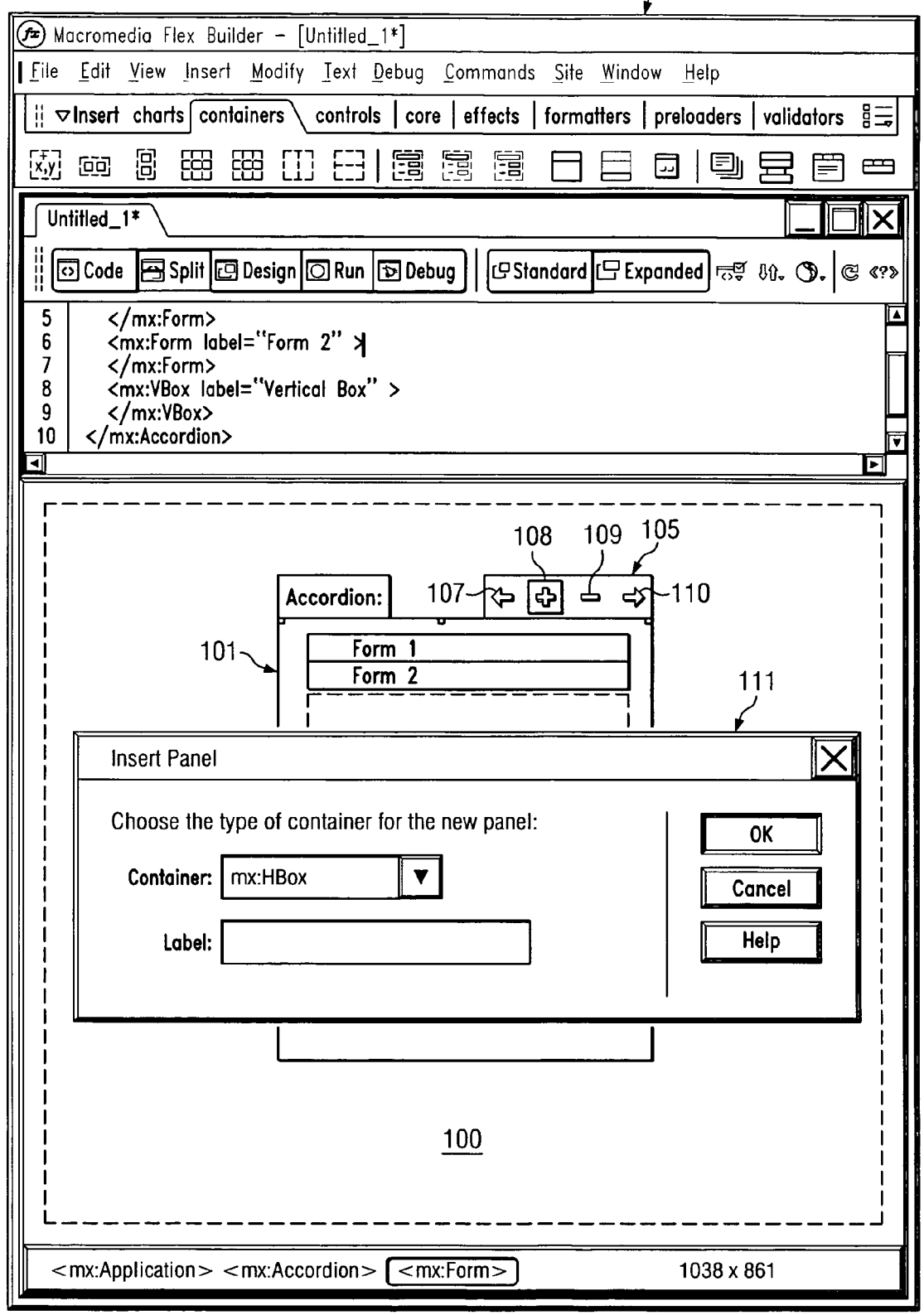
FIG. 1B is a screenshot illustrating an application development environment configured according to one embodiment of the present invention displaying dialog box.

FIG. 1B is a screenshot illustrating application development environment 10 configured according to one embodiment of the present invention displaying dialog box 111. While the developer's interaction with navigation buttons 107 and 110 of badge control 105 is forwarded to the actual component for execution in the simulated runtime environment of the component, the developer's interaction with editing buttons 108 and 109 is forwarded to the editing environment to affect the function and appearance of accordion navigator 101. If the developer wishes to add a page to accordion navigator 101, he or she would only have to select add button 108 in badge control 105. Once such an action is detected, the sequence of actions for adding a frame to an accordion navigator is executed. Dialog box 111 is displayed to the developer requesting selection of the type of container to add as well as any label to be provided. Once this information is provided by the developer, application development environment 10 inserts the code to add a page in accordion navigator 101. The developer has no further action to take. In similar action, if the developer selects delete button 109, application development environment 10 would delete the code and corresponding visual objects representing the current page displayed on accordion navigator 101.

Figure 2:
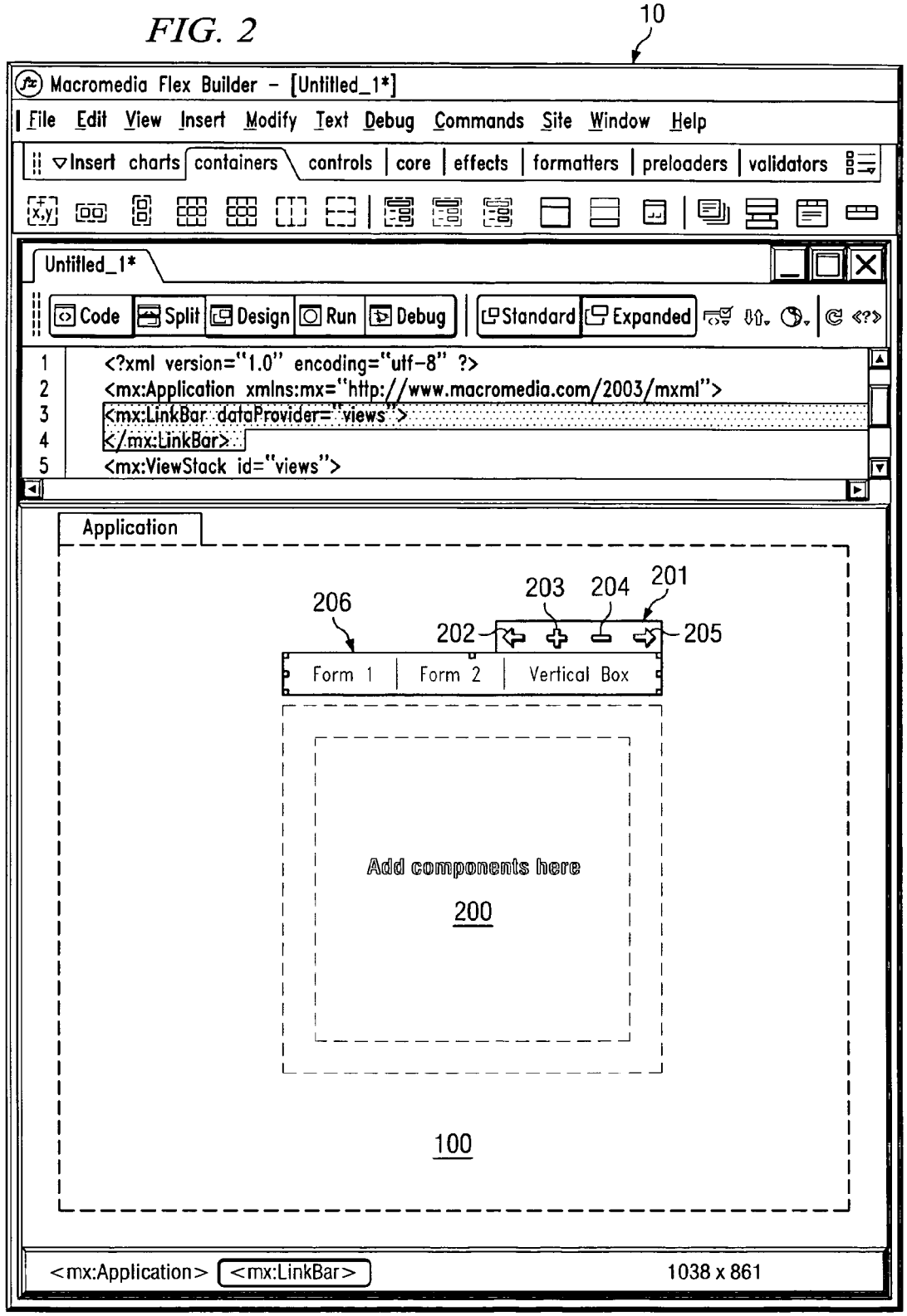
FIG. 2 is a screenshot illustrating an application development environment configured according to one embodiment of the present invention.

FIG. 2 is a screenshot illustrating application development environment 10 configured according to one embodiment of the present invention. The enhanced navigational tool embodied in control panel 201 is applicable to any type of stacked or layered object or navigational container. Control panel 201 is associated with link bar 206. Link bar 206 is a navigation object that is associated or related to stacked navigator 200. While link bar 206 is shown in close proximity to stacked navigator 200, it may be positioned almost anywhere on the page without consideration of where on the page stacked navigator 200 is located. When the links on link bar 206 are manipulated, the views of stacked navigator 200 are controlled regardless of where link bar 206 is located.

Within the context of application development environment 10, even though control panel 201 is rendered with the user selection of link bar 206, navigational buttons 202 and 205 operate to sequence stacked navigator 200 through its pages, while editing buttons 203 and 204 either add or delete pages from stacked navigator 200. It should be noted that a different control box (not shown) would be rendered that is also associated or related to stacked navigator 200 when the user selects stacked navigator 200. In the example depicted in FIG. 2, control panel 201 appears on selection of link bar 206 even though link bar 206 is not a stacked object. However, control panel 201 still controls the presentation and composition of the views of stacked navigator 200.

Figure 3:
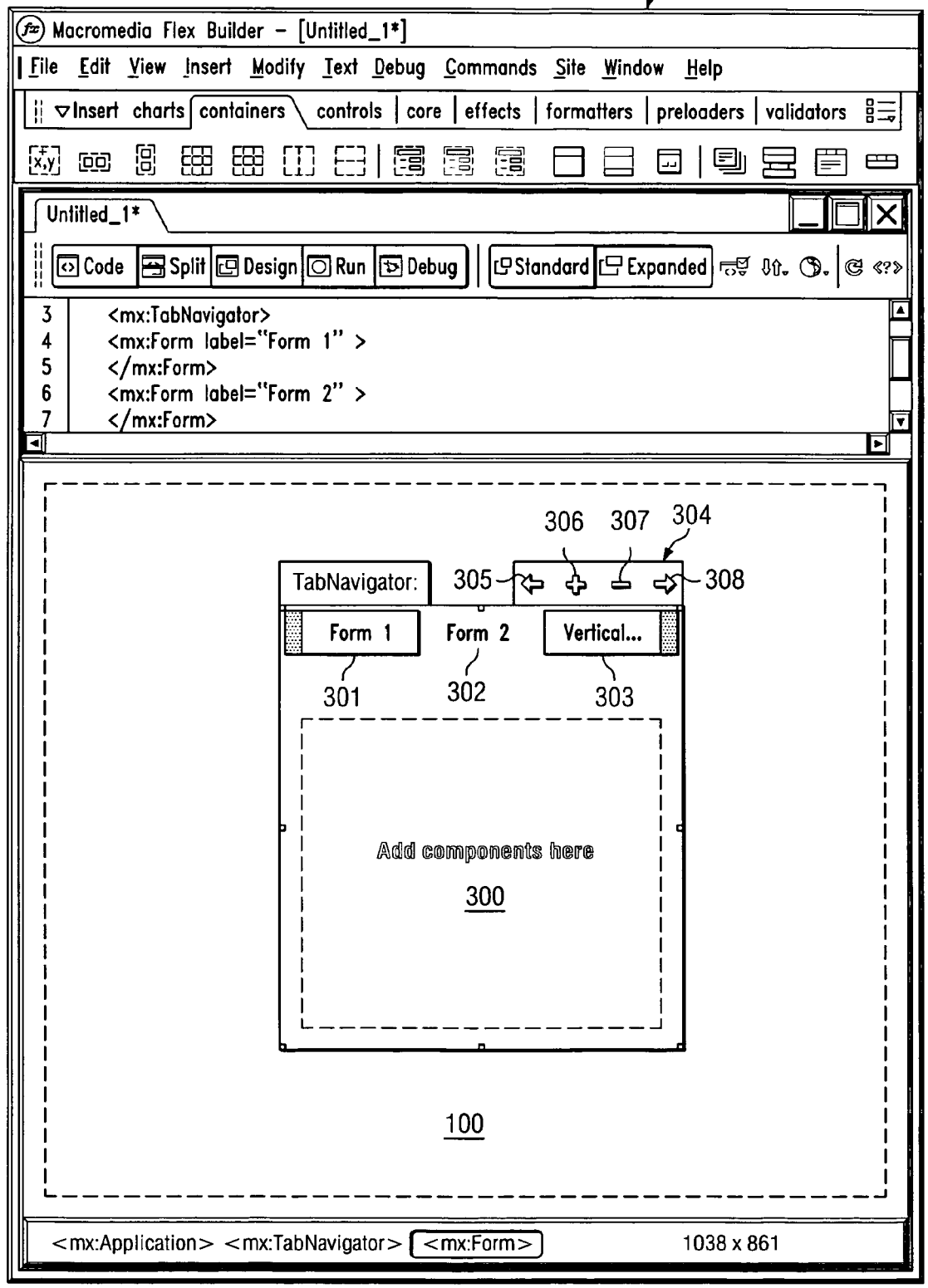
FIG. 3 is a screenshot illustrating an enhanced navigator in an application development environment configured according to one embodiment of the present invention.

FIG. 3 is a screenshot illustrating enhanced navigator 304 in application development environment 10 configured according to one embodiment of the present invention. Enhanced navigator 304 is provided in conjunction with tabbed navigator 300. As a developer selects navigation buttons 305 and 308, the content of tabbed navigator 300 would change just as if the developer were selecting one of tabs 301-303. Similarly, in order to add or subtract tabbed pages, the developer would select from one of editing buttons 306 and 307. Thus, enhanced navigator 304 assists the developer in the development and operation of an application that includes a stacked object, such as tabbed navigator 300.

In operation, many different methods may be used to implement the enhanced navigation tool. In the context of MACROMEDIA INC.'s FLEX BUILDER™, a layered masking system is used. In FLEX BUILDER™, instead of placing a separate mask on top of each component placed in the editing canvas, as done in DELPHI™, a single, transparent mask is placed over the entire canvas. The FLEX BUILDER™graphical design view editing mode is actually running an instance of an interactive multimedia runtime container (iMRC), such as MACROMEDIA, INC.'s MAC- ROMEDIA FLASH™ player. The visual representation of the MXML™ code in the FLEX BUILDER™ code view is presented as a Small Web File (SWF) movie played in the MACROMEDIA FLASH™ player operating as the design view canvas. MXML™ is a trademark of MACROMEDIA, INC., and is a specialized, XML-based language used in developing Rich Internet Applications (RIAs). MXML™ is native to the FLEX BUILDER™ development environment. It allows definition of the final appearance of an application's user interface without specifying a time-based sequence of steps for constructing that interface, but also includes availability of program logic, delivered by ACTIONSCRIP™, or the like, within the declarative MXML™ statements.

The application components run directly in the iMRC. This ensures that each component appears and functions properly. Edit interface elements, such as sizing handles and the like, are then provided in an overlay layer on top of the iMRC layer. A final mask layer covers the entire design view canvas of the iMRC. The developer's interactions in the design view are intercepted by the mask layer and analyzed to determine what results are expected from the interaction. If the interactions are found to be over the editing interface elements of the overlay layer, then code is executed to manipulate the physical appearance of the component in the SWF file running in the design view canvas. If, on the other hand, the interaction is found to be interacting with the component instance, the action is passed to the iMRC to be completed by the component instance.

The enhanced navigator element is an object that is provided in the overlay layer of the FLEX BUILDER™ design view system. If the developer interactions are placed over the navigation buttons of the enhanced navigator, then navigation commands are issued to the underlying component. Similarly, if the interactions are determined to be over the editing buttons of the enhanced navigator, then editing commands are issued to the application development environment to add or delete objects of the stacked container.

Figure 4:
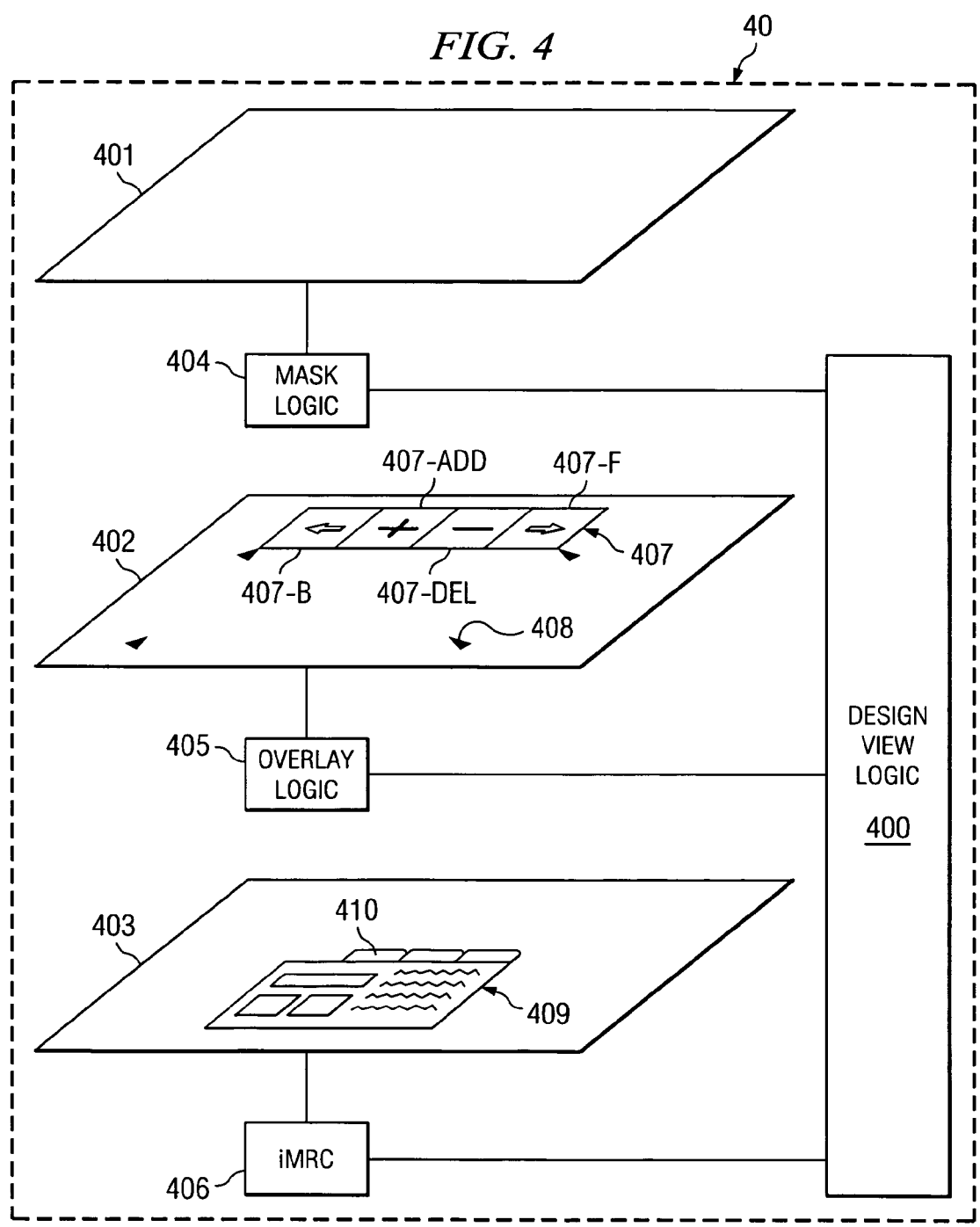
FIG. 4 is a block diagram illustrating an application development environment configured according to another embodiment of the present invention.

FIG. 4 is a block diagram illustrating application development environment 40 configured according to another embodiment of the present invention. Application development environment 40 implements its graphical editing feature using multiple layers 401-403. Component layer 403 comprises an instance of iMRC 406. The application under design in application development environment 40 is presented as a multimedia file, including the application components, such as tabbed navigator 409, running on iMRC 406. Overlay layer 402 is rendered by overlay logic 405 to display the various edit interface elements, such as sizing handles 408 and enhanced navigator 407. Finally, mask layer 401 is maintained by mask logic 404. Each layer is monitored and controlled by design view logic 400. Design view logic 400 performs the various processing to implement the graphical editing feature of application development environment 40.

In operation, as the developer operates or interacts graphically with the application under edit, the developer's actions are captured in mask layer 401 and sent by mask logic 404 to design view logic 400. Design view logic 400 determines where, on the design view canvas, the developer's actions have taken place. For purposes of example, a first developer interaction is determined by design view logic 400 to occur over navigation button 407-B of enhanced navigator 407. Because the interaction occurs on an element of overlay layer 402, design view logic 400 signals overlay logic 405 to change the appearance of navigation button 407-B, into a depressed or clicked state. Moreover, because the interaction is to cause a navigation of the associated tabbed navigator 409, design view logic 400 passes a command to component layer 403 that moves the current stack of tabbed navigator 409 back a single page. Responsive to the operation of this component command, iMRC 406 processes the underlying component code which changes the page presented on tabbed navigator 409. To the developer, however, it appears that he has pressed the back button on enhanced navigator 407 and caused tabbed navigator 409 to change tabs; all within the same layer.

If, for purposes of this example, design view logic 400 had determined that the user action occurred over tab 410 of tabbed navigator 409, the action would be passed as a component command directly to component layer 403 indicating that tab 410 had been selected, thus, causing iMRC 406 to update tabbed navigator 409 to reflect the page associated with tab 410.

It should be noted that the example operation described in MACROMEDIA FLEX BUILDER™ is merely one example implementation. Other application development environments, such as DREAMWEAVER™, MICROSOFT CORPORATION's FRONTPAGE™, DELPHI™, JBUILDER™, or the like may also incorporate the enhanced navigator tool for stacked objects. Such development environments may not use a layering mechanism to implement a graphical design view editor, but may provide a direct rendering of the application under edit. In such application development environments, the enhanced navigator would be directly rendered in the design view allowing the developer to directly manipulate and create such stacked objects or navigators.

Figure 5:
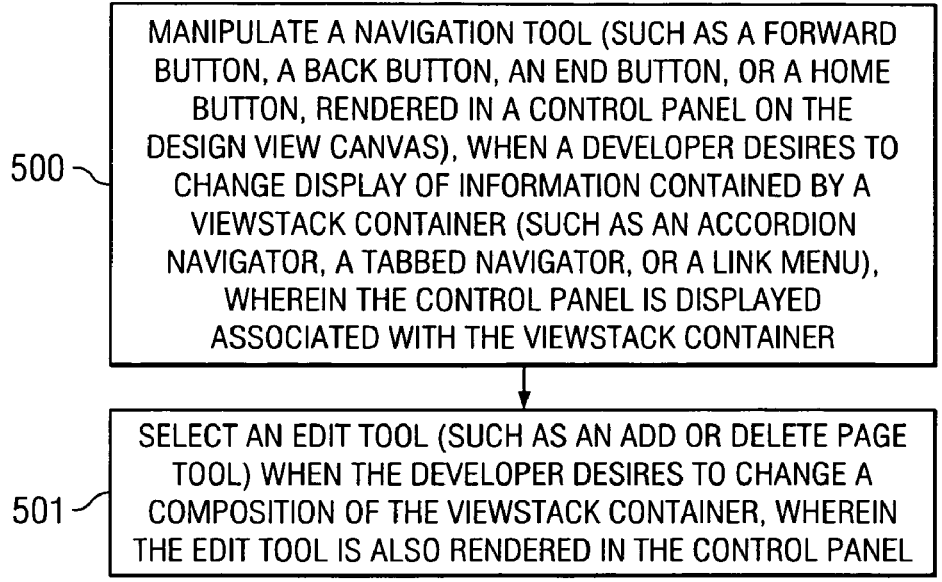
FIG. 5 is a flowchart illustrating example steps executed in implementing one embodiment of the present invention.

FIG. 5 is a flowchart illustrating example steps executed in implementing one embodiment of the present invention. In step 500, a navigation tool (such as a forward button, a back button, an end button, or a home button, rendered in a control panel on the design view canvas), is manipulated by a developer when the developer desires to change display of information contained by a viewstack container (such as an accordion navigator, a tabbed navigator, or a link menu), wherein the control panel is displayed associated with the viewstack container. Select an edit tool (such as an add or delete page tool), in step 502, when the developer desires to change a composition of the viewstack container, wherein the edit tool is also rendered in the control panel. Therefore, by interacting with the tools in the control panel, the developer may manipulate both the composition and display of the viewstack container.

Figure 6:
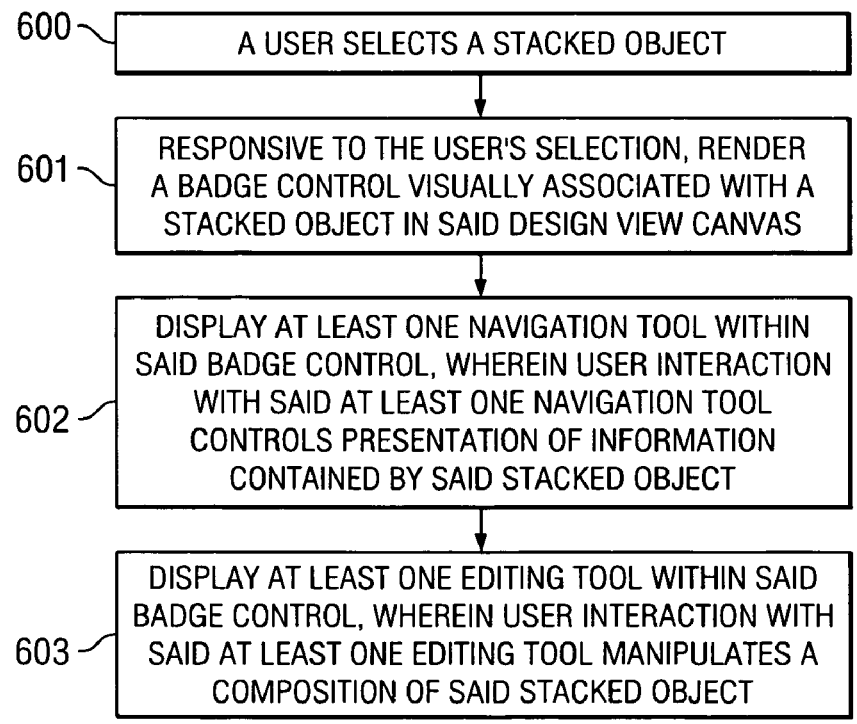
FIG. 6 is a flowchart illustrating example steps executed in implementing another embodiment of the present invention.

FIG. 6 is a flowchart illustrating example steps executed in implementing another embodiment of the present invention. In step 600, a user selects a stacked object. Responsive to the user's selection, a badge control is rendered, in step 601, visually associated with a stacked object in the design view canvas. At least one navigation tool is displayed within the badge control, in step 602, wherein user interaction with the navigation tool controls presentation of information contained by the stacked object. At least one editing tool is displayed within the badge control, in step 603, wherein user interaction with the editing tool manipulates a composition of the stacked object.

The program or code segments making up the various embodiments of the present invention may be stored in a computer readable medium or transmitted by a computer data signal embodied in a carrier wave, or a signal modulated by a carrier, over a transmission medium. The "computer readable medium" may include any medium that can store or transfer information. Examples of the computer readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, and the like. The computer data signal may include any signal that can propagate over a transmission medium such as electronic network channels, optical fibers, air, electromagnetic, RF links, and the like. The code segments may be downloaded via computer networks such as the Internet, Intranet, and the like.

Figure 7:
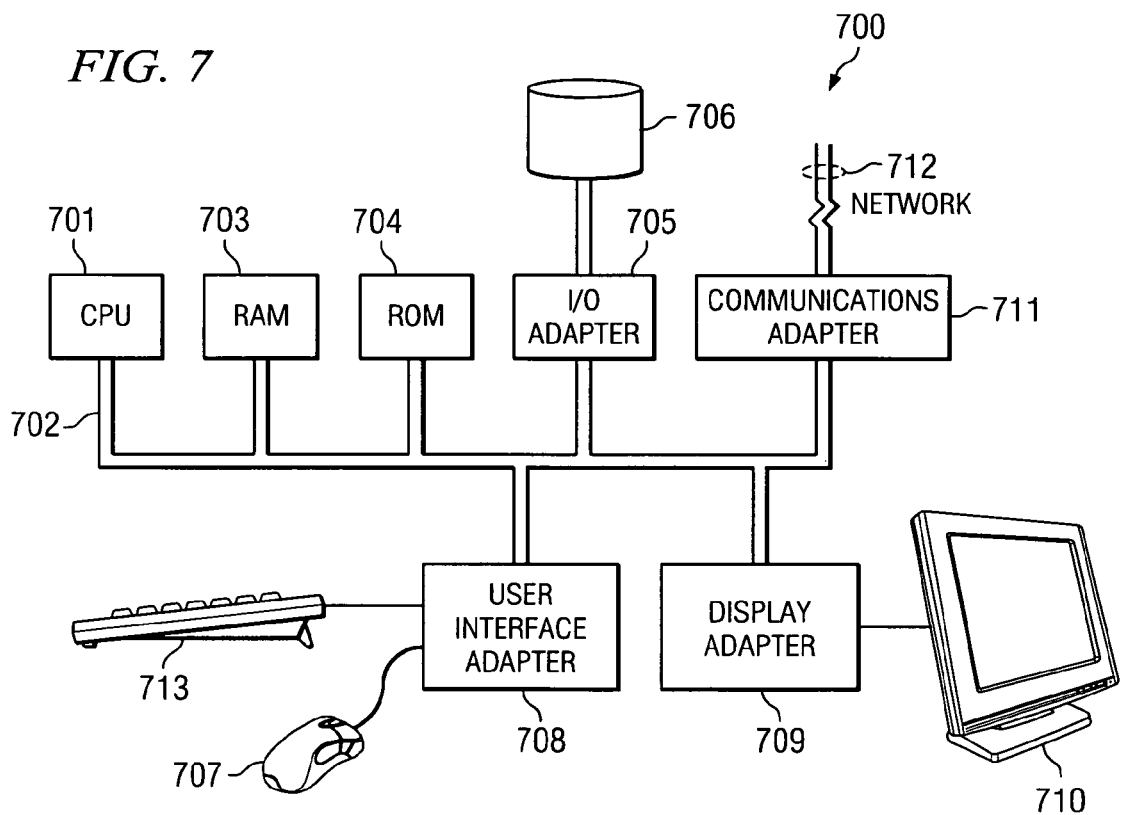
FIG. 7 illustrates a computer system adapted to use embodiments of the present invention.

FIG. 7 illustrates computer system 700 adapted to use embodiments of the present invention, e.g. storing and/or executing software associated with the embodiments. Central processing unit (CPU) 701 is coupled to system bus 702. The CPU 701 may be any general purpose CPU. However, embodiments of the present invention are not restricted by the architecture of CPU 701 as long as CPU 701 supports the inventive operations as described herein. Bus 702 is coupled to random access memory (RAM) 703, which may be SRAM, DRAM, or SDRAM. ROM 704 is also coupled to bus 702, which may be PROM, EPROM, or EEPROM. RAM 703 and ROM 704 hold user and system data and programs as is well known in the art.

Bus 702 is also coupled to input/output (I/O) controller card 705, communications adapter card 711, user interface card 708, and display card 709. The I/O adapter card 705 connects storage devices 706, such as one or more of a hard drive, a CD drive, a floppy disk drive, a tape drive, to computer system 700. The I/O adapter 705 is also connected to a printer (not shown), which would allow the system to print paper copies of information such as documents, photographs, articles, etcetera. Note that the printer may be a printer (e.g., dot matrix, laser, etcetera), a fax machine, scanner, or a copier machine. Communications card 711 is adapted to couple the computer system 700 to a network 712, which may be one or more of a telephone network, a local (LAN) and/or a wide-area (WAN) network, an Ethernet network, and/or the Internet network. User interface card 708 couples user input devices, such as keyboard 713, pointing device 707, etcetera, to the computer system 700. The display card 709 is driven by CPU 701 to control the display on display device 710.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, and composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for providing an edit resource in a design view canvas of an application development environment, said method comprising:

rendering a badge control associated with a stacked object in said design view canvas, wherein the stacked object is a user interface object of an application under development in the application development environment;

rendering a first layer in said design view, wherein said stacked object is displayed in said first layer, said first layer inaccessible to a user;

displaying at least one navigation tool within said badge control, wherein user interaction with said at least one navigation tool controls presentation of information contained by said stacked object; and displaying at least one editing tool within said badge control, wherein user interaction with said at least one editing tool manipulates a composition of said stacked object.

2. The method of claim 1 wherein said badge control is rendered responsive to a user selecting said stacked object.

3. The method of claim 1 wherein said at least one navigation tool comprises one or more of:

a forward button;

a back button;

an end button; and a home button.

4. The method of claim 1 wherein said at least one editing tool comprises one or more of:

a page add tool; and a page delete tool.

5. The method of claim 1 wherein said stacked object comprises one or more of:

an accordion navigator;

a tabbed navigator;

a tab bar; and a link menu.

6. The method of claim 5 wherein said stacked object comprises one of:

said tab bar; and said link menu;

wherein said control badge is rendered in response to user selection of a navigating object linked to said stacked object.

7. The method of claim 1 further comprising rendering a second layer on top of said first layer, wherein said badge control is rendered in a second layer.

8. The method of claim 7 further comprising:

rendering a third layer on top of said second layer, wherein said user interaction is captured by said third layer.

9. The method of claim 7 wherein said user interaction is captured by said second layer.

10. The method of claim 1 wherein the stacked object is a user interface object included in an output presentation of a web page under development in the application development environment.

11. The method of claim 10 wherein said design view canvas shows said output presentation of the web page under development.

12. A method for editing a viewstack container in of an application development environment including a design view and a code view, wherein said design view shows an output presentation of an application under development in said application development environment, said method comprising:

manipulating a navigation tool when a developer desires to change display of information contained by said viewstack container, wherein said navigation tool is rendered within a control panel displayed on said design view in relation to said viewstack container; and choosing between editing said design view and editing said code view textually wherein said editing said design view comprises: selecting an edit tool when said developer desires to change a composition of said viewstack container, wherein said edit tool is rendered in said control panel.

13. The method of claim 12 wherein said navigation tool comprises one or more of:
   a forward selector;
   a back selector;
   an end selector; and
   a home selector.

14. The method of claim 12 wherein said edit tool comprises one or more of:
   a page add selector; and
   a page delete selector.

15. The method of claim 12 wherein said viewstack container comprises one or more of:
   an accordion navigator;
   a tabbed navigator;
   a tab bar; and
   a link menu.

16. The method of claim 15 wherein said control panel is rendered in response to user selection of a navigating object linked to said viewstack container.

17. The method of claim 12 further comprising:
   selecting a second viewstack container displayed in said design view;
   removing said control panel associated with said viewstack container; and
   rendering a second control panel associated with said second viewstack.

18. The method of claim 12 wherein said viewstack container comprises a user interface object that is included in the output presentation of the application under development in said application development environment.

19. A computer program product having a computer readable storage medium with computer program logic recorded thereon providing an edit resource in a design view canvas of an application development environment, wherein said design view canvas shows an output presentation of an application under development in said application development environment, said computer program product comprising:
   code for rendering, on said design view canvas, a control box associated with a stacked navigator, wherein said stacked navigator is a user interface object that is included in the output presentation of the application under development in said application development environment;
   code for rendering said stacked navigator in a first layer of said design view surface, wherein said first layer is inaccessible to a user;
   code for providing at least one navigation tool within said control box, wherein user interaction with said at least one navigation tool controls display of information contained by said stacked navigator; and
   code for providing at least one editing tool within said badge control, wherein user interaction with said at least one editing tool manipulates a composition of said stacked navigator.

20. The computer program product of claim 19 wherein said control box is rendered responsive to a user selecting said stacked navigator.

21. The computer program product of claim 19 wherein said at least one navigation tool comprises one or more of:
   a forward button;
   a back button;
   an end button; and
   a home button.

22. The computer program product of claim 19 wherein said at least one editing tool comprises one or more of:
   a page add tool; and
   a page delete tool.

23. The computer program product of claim 17 wherein said stacked navigator comprises one or more of:
   an accordion navigator;
   a tabbed navigator;
   a tab bar; and
   a link menu.

24. The computer program product of claim 23 wherein said control box is rendered in response to user selection of a navigator object linked to said stacked navigator.

25. The computer program product of claim 19 further comprising:
   code for rendering said control box in a second layer of said design view surface on top of said first layer.

26. The computer program product of claim 25 further comprising:
   code for rendering a third layer on top of said second layers wherein said user interaction is captured by said third layer.

27. The computer program product of claim 25 wherein said user interaction is captured by said second layer.

28. A system for editing a navigator object in an application development environment, said system comprising:
   means for rendering a badge control associated with a navigator object in a design view canvas of the application development environment, wherein said design view canvas shows an output presentation of an application under development in said application development environment, and wherein said navigator object is a user interface object that is included in the output presentation of the application under development in said application development environment;
   means for rendering a first layer in said design view, wherein said navigator object is displayed in said first layer, said first layer inaccessible to a user;
   means for displaying one or more navigation tools within said badge control, wherein user interaction with said one or more navigation tools controls presentation of information contained by said navigator object; and
   means for displaying one or more edit tools within said badge control, wherein user interaction with said one or more edit tools manipulates a composition of said navigator object.

29. The system of claim 28 wherein said badge control is rendered responsive to a user selecting said navigator object.

30. The system of claim 28 wherein said one or more navigation tools comprises one or more of:
   a forward button;
   a back button;
   an end button; and
   a home button.

31. The system of claim 28 wherein said one or more edit tools comprises one or more of:
   a page add tool; and
   a page delete tool.

32. The system of claim 28 wherein said navigator object comprises one or more of:
   an accordion navigator;
   a tabbed navigator;
   a tab bar; and
   a link menu.

33. The system of claim 32 wherein said navigator object comprises one of:
 said tab bar; and
 said link menu;
 wherein said badge control is rendered in response to user selection of a view control object linked to said navigator object.

34. The system of claim 28 further comprising: means for rendering a second layer on top of said first layer, wherein said badge control is rendered in a second layer.

35. The system of claim 34 further comprising:
 means for rendering a third layer on top of said second layer, wherein said user interaction is captured by said third layer.

36. The system of claim 34 wherein said user interaction is captured by said second layer.

\* \* \* \* \*

UNITED STATES PATENT AND TRADEMARK OFFICE
CERTIFICATE OF CORRECTION

| | | |
|---|---|---|
| PATENT NO. | : 7,631,290 B1 | Page 1 of 1 |
| APPLICATION NO. | : 10/974556 | |
| DATED | : December 8, 2009 | |
| INVENTOR(S) | : Reid et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1339 days.

Signed and Sealed this

Second Day of November, 2010

David J. Kappos
*Director of the United States Patent and Trademark Office*